July 23, 1940. W. C. JAEGLE 2,208,929
VALVE
Filed March 18, 1938 2 Sheets-Sheet 1

INVENTOR.
William C. Jaegle
BY Ramsey, Kent, Chisholm and Lutz
his ATTORNEYS

Patented July 23, 1940

2,208,929

UNITED STATES PATENT OFFICE 2,208,929

VALVE

William C. Jaegle, Plainview, Long Island, N. Y., assignor to Herman Strahman, Livingston, N. J.

Application March 18, 1938, Serial No. 196,666

4 Claims. (Cl. 251—156)

This invention relates to improvements in valves and more particularly to improvements in valves of the type utilizing a cylindrical plunger in conjunction with a ring of packing material for accomplishing a seal.

An object of the present invention is to provide a valve of such simplified construction that the same can be manufactured and serviced at a minimum of cost and labor.

Another object of the invention is to provide an improved valve construction utilizing a ring packing and a cylindrical plunger for forming the primary seal, and in addition to provide a secondary seal cooperating with the primary seal.

Another object of the invention is to provide a valve of the foregoing character in which the packing ring cooperating with the plunger to form a seal can be compressed at will without necessitating removal of any parts of the valve.

A further object of the invention is to provide a valve of such construction that flow therethrough is facilitated due to the substantial elimination of any sharp corners or other obstacles which might cause air currents.

An additional object of the invention is to provide a valve construction of the foregoing character in which a compressing ring utilized for compressing the ring of sealing material serves also as a seat for a secondary valve member.

In carrying out the foregoing and other objects of the invention a valve constructed in accordance therewith comprises a casing having an inlet opening and an outlet opening. The casing is so constructed as to have intermediate these openings a platform upon which can be located a ring or rings of packing material utilized in forming a seal. Instead of providing a cage in the sense commonly known to valves, the present invention makes use of a bonnet which is introduced into the valve casing in such fashion that the lower end thereof can be brought into contact with the sealing ring or rings. This bonnet has the lower part thereof hollowed out and the lower end internally threaded for the reception of a metallic sealing ring. The bonnet is locked in place by means of bolts and nuts passing through flanges on the casing and on the bonnet whereby tightening of such bolts and nuts results in compression of the packing ring or rings. In addition the bonnet has a valve stem opening therethrough threaded for the reception of a threaded valve stem. The lower end of the valve stem has a plunger secured thereto in what may be called floating fashion, which plunger is adapted to pass through the sealing ring in the lower end of the bonnet and into the packing ring to form a primary seal. The plunger has a part thereof near its top, tapered outwardly for contact with the inner edge of the top of the metallic sealing ring beforementioned, so that continued downward movement of the plunger forces this tapered surface into such contact with the ring as to form a good secondary seal. The bonnet in one form has a single port in communication with the outlet opening, it being understood that the hollowed-out part of the lower end of the bonnet is in communication with the inlet passage of the valve when the plunger is elevated. In another form of the invention, the casing of the valve is provided with an enlargement in communication with the outlet opening and in this form of the invention the bonnet is provided with a plurality of ports in communication with such enlargement. In each form of the invention packing material may be located between the bonnet and the valve casing to prevent undesired leakage and suitable packing may be located around the upper end of the valve stem to prevent leakage.

Other features and objects of the invention will become apparent by reference to the following detailed description of the accompanying drawings illustrating the same, wherein.

Figures 1, 2:
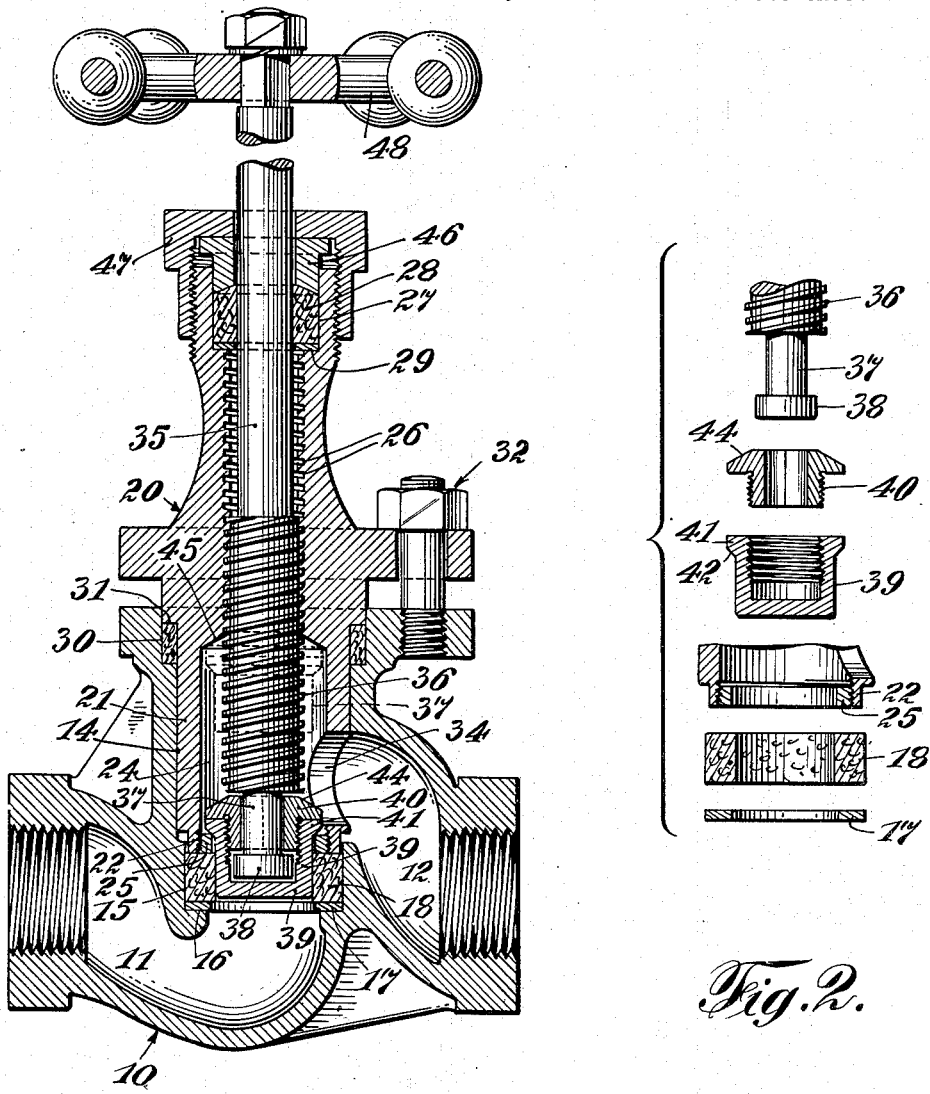
Fig. 1 is a vertical section of one embodiment of the invention.
Fig. 2 is a vertical section of parts of the valve assembly prior to their installation in the valve casing.

Referring now to the drawings and particularly to Figs. 1 and 2, 10 indicates generally a valve casing having an inlet passage 11 and an outlet passage 12. The casing is provided with a bore 14 having a portion 15 of reduced diameter terminating at an annular seat 16. The bore represented by the composite portions 14 and 15 is in communication with the inlet passage 11 and outlet passage 12. Positioned on the seat 16 is a base ring 17 of some suitable metal. Positioned on top of the base ring 17 and in intimate contact with the wall of the portion 15 is packing material 18 in the form either of a single ring or of several superimposed rings. Preferably use is made of laminated asbestos base packing material.

In order that this packing material 18 can be held in place and be properly compressed use is made of a bonnet, indicated generally at 20, which bonnet has the lower portion 21 thereof of such diameter as to fit snugly in the bore portion 14 of the barrel casing. The actual end of this bonnet is of reduced diameter as indicated at 22 to cause it to fit within the bore portion 15 with a small amount of clearance. The lower end of the bonnet is hollowed out as at 24 to a diameter slightly greater than the diameter of the base ring 17 and the packing 18. The lower end of this hollowed-out part is internally threaded for the reception of an externally threaded sealing ring 25 which may be made of some suitable metal which by preference is stainless steel. This ring is so engaged with the bonnet that the lower edge of the bonnet and the lower face of the ring form a plane surface. The bonnet has a bore in addition to the portion 24 but of smaller diameter and internally threaded as indicated at 26. Near the upper end of this threaded bore portion is an enlargement 27 for the reception of suitable packing material 28 resting on a supporting base ring 29. The bore of the valve casing is enlarged as shown at 30 for the reception of packing material which can be held in place by an annular shoulder 31 of the bonnet. The bonnet and casing are locked together by means of suitable nut and bolt arrangements indicated generally at 32, with these parts so registered that an opening 34 in the lower end of the bonnet will of necessity be in communication with the outlet passage 12 of the valve casing. This opening 34 extends entirely through the wall of the portion 21 thereby providing communication between the hollowed-out part of the bonnet and the outlet opening.

In conjunction with the bonnet use is made of a valve stem 35 having a part thereof externally threaded as at 36 to engage the internal threads 26 of the bonnet. The lower end of the stem 35 is of reduced diameter to form a neck portion 37 terminating in an annular flange 38. Secured to the lower end of the stem 35 is a plunger or piston 39 which as shown in Figs. 1 and 2, is of substantially U-shape in cross section. This member 39 is internally threaded for the reception of a split nut 40. To assemble these parts it is only necessary to fit the split nut 40 around the neck portion 37 of the valve stem after which the plunger 39 can be screwed tight thereonto. These parts are manufactured with such tolerance that the plunger resulting from the union of the member 39 and the split nut 40 are capable of slight movement relative to the end of the stem 35, or in other words, the plunger is of so-called floating type. The outer upper edge of the member 39 is flared outwardly as indicated at 41 with tapered surface 42 spaced a slight distance below the top surface thereof, which tapered part 42 is designed for a purpose to be explained later. The top surface of the split nut 40 is tapered as at 44, which taper is of substantially the same inclination as that of the top part of the hollowed-out portion 24 as shown at 45.

The parts just described may be assembled as follows: let it be assumed that the bonnet is separate from the casing as a result of which it is possible to thread the stem 35 through the bonnet until the neck portion 37 extends below the lower end of such bonnet. The plunger made up of member 39 and split nut 40 may be fastened onto the lower end of the valve stem in an obvious manner. The stem may then be retracted until it is positioned well within the hollowed-out part 24, after which the sealing ring 25 may be introduced into the lower end of the bonnet. When these parts have been so assembled the bonnet can then be introduced into the valve casing in which previously the base ring 17 and the packing ring or rings 18 have been positioned. The bonnet may then be locked in place by the bolt and nut assemblies 32, and these assemblies are tightened until the packing ring 18 has been placed under the desired compression. At the same time the packing material in the recess 30 will likewise be compressed to prevent any undesired leakage between the bonnet and the valve casing. Moreover, the packing 28 can be introduced into the gland 27 either before or after assembly of the bonnet with the casing and such packing can be compressed by a compression member 46 forced downwardly by a nut member 47 externally threaded onto the top of the bonnet. This packing prevents leakage around the valve stem. An operating handle 48 is secured to the upper end of the valve stem in some conventional fashion.

With the parts so assembled, the valve is in condition to be placed in any desired line and when so placed the operation thereof is substantially as follows: assuming that the plunger 39 is in the full open position as shown in broken lines in Fig. 1, flow of material through the valve will be through the inlet passage 11, through the bore defined by packing 18 and ring 25 into the hollowed-out part 24, thence through the opening 34 into the outlet opening 12. It should be noted that the flow so described is more or less an easy flow due to the absence of any corners which might cause eddy currents or which might interfere with the rhythmic flow of the material. When it is desired to close the valve it is necessary only to rotate the stem 35 which rotation forces the plunger 39 downwardly until it enters the space defined by the inner wall of packing 18. The engagement of the plunger 39 and the packing 18 forms a seal which, as is customary in these types of valves, prevents further flow of material through the valve. However, the present arrangement has the added feature that further downward movement of the plunger brings the tapered surface 42 into contact with the inner upper edge of the ring 25 and such contact furnishes a second seal. Thus double protection is provided by this valve against undesired leakage. The valve possesses a further advantage that repacking of the gland 27 can be accomplished when the valve is completely open since the tapered surface 44 engages the similarly tapered surface 45 with such an intimate contact as to provide a good seal. Consequently, when the valve is open, or in the dotted line position of Fig. 1, it will be possible to repack the gland 27. A further advantage present in this arrangement comprises the ease with which the packing 18 may be further compressed as wear may take place. It is not necessary to remove any parts of the valve structure since the additional compression can be obtained by further tightening the conventional bolt and nut assemblies 32 utilized for securing the bonnet to the valve casing. Such further pressure is applied through the end of the bonnet and the ring 25 to further compress the packing 18 and thereby force some portion thereof inwardly an amount sufficient to restore good sealing properties. If desired the ring 25 instead of terminating flush with the end of the bonnet can be provided with an annular flange part which will fit under the end of the bonnet thereby providing an unbroken plane surface. Also the secondary seal before described is established without compressing the sealing ring 18, since both the plunger and sealing ring 25 are secured to the bonnet.

Figure 3:
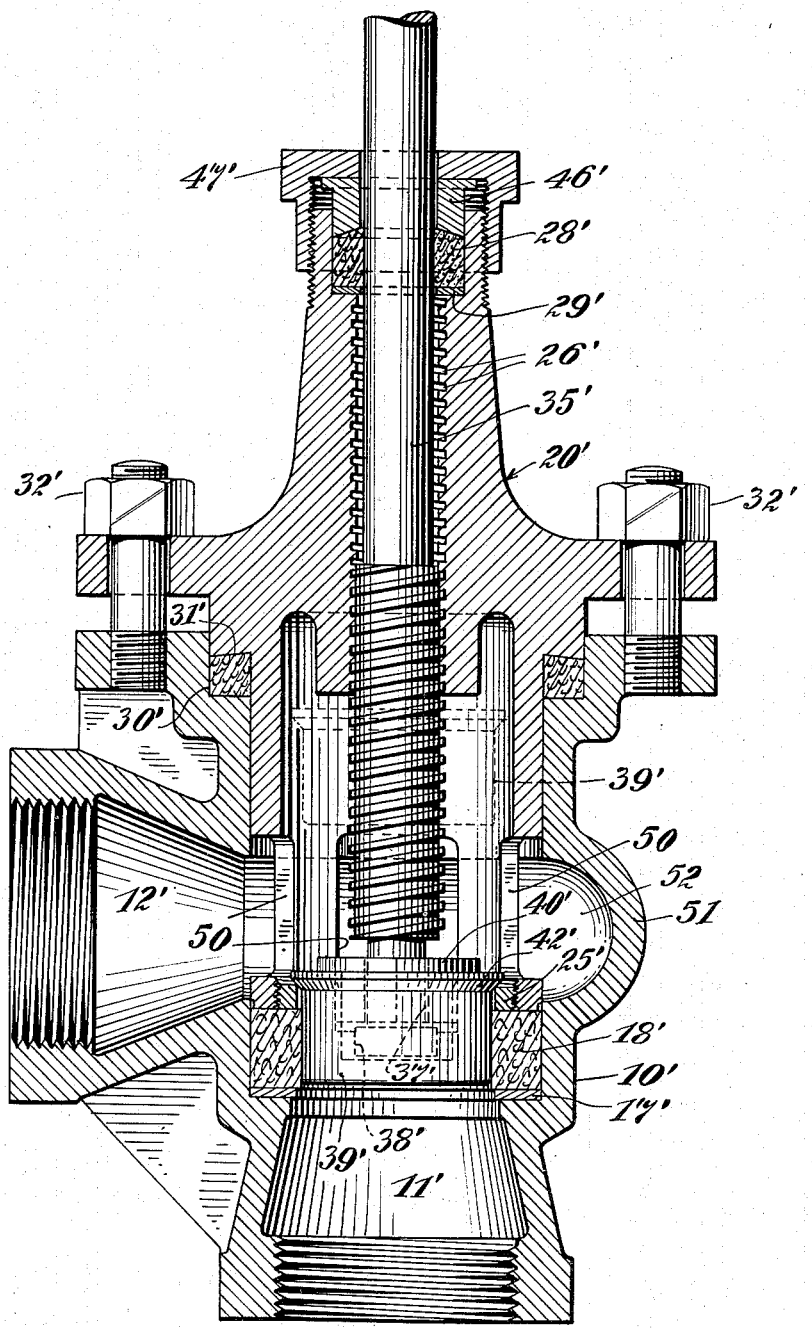
Fig. 3 is a vertical section of a second embodiment of the invention.

In Fig. 3 an arrangement has been shown wherein a valve incorporates the essential features of the present invention in a somewhat modified form. In this arrangement, for all purposes, the valve casing while of different shape is substantially the same as the valve casing previously described, and accordingly, similar parts have been given the same reference characters with the addition of a prime. For example, the valve casing 10' has an inlet passage 11' and an outlet passage 12'. Use is made of a bonnet 20' having a plunger 39' secured to the lower end of a stem 35' passing through the bonnet. In this structure use is also made of a base ring 17', packing 18' and a sealing ring 25', all similar to the parts previously described. However, the bonnet instead of being provided with a single opening 34 is provided with a plurality of openings 50 spaced at intervals completely therearound. In addition the valve casing is provided with an enlargement 51 extending substantially completely therearound and into communication with the outlet 12', which enlargement 51 provides a channel 52 extending around the bonnet. The various ports 50 open into this channel 52 so that material entering the valve through the opening 11' and into the interior of bonnet 20' can pass through the ports 50 into the channel 52 and out of the valve through the outlet opening 12'.

What is claimed is:

1. A valve of the character described comprising a casing having inlet and outlet openings, a ring of compressible packing material positioned intermediate said openings, a bonnet having the lower end hollowed out, said bonnet being inserted into said casing with the lower end thereof in contact with the top of said packing ring, means for securing said bonnet to said casing and for simultaneously applying pressure through said bonnet to compress said packing ring, a valve stem passing through said bonnet into the hollowed-out part thereof, a flanged-top plunger secured to the end of said valve stem in position to be moved into sealing relation with the inner wall of said packing ring, and means removably secured in said bonnet in the path of movement of the flanged-top of said plunger for arresting movement of said flanged-top before it can apply compression to said packing ring.

2. A valve of the character described comprising a valve casing having inlet and outlet openings, a compressible sealing ring interposed between said openings, a bonnet having the lower end thereof hollowed out and inserted into said casing into contact with the top of said sealing ring, means for securing said bonnet to said casing and for simultaneously forcing the same into compression relation to said sealing ring, said bonnet having a metallic ring removably secured in the lower end thereof against longitudinal movement relative to said bonnet, and a valve stem passing through said bonnet and having a plunger on one end thereof, said plunger being movable into sealing relation with the inner wall of said sealing ring, and having a tapered annular surface for sealing contact with said metallic ring.

3. A valve of the character described comprising a valve casing having inlet and outlet openings, a compressible sealing ring interposed between said openings, a bonnet having the lower end thereof hollowed out and inserted into said casing into contact with the top of said sealing ring, means for securing said bonnet to said casing and for simultaneously forcing the same into compression relation to said sealing ring, said bonnet having an opening in the wall thereof communicating with said openings, said bonnet having a metallic ring removably secured in the lower end thereof against longitudinal movement relative to said bonnet, and a valve stem passing through said bonnet and having a plunger on one end thereof, said plunger being movable into sealing relation with the inner wall of said sealing ring, and having a tapered annular surface for sealing contact with said metallic ring.

4. A valve of the character described comprising a valve casing having inlet and outlet openings, a compressible sealing ring interposed between said openings, said casing having a channel in the wall thereof extending therearound in communication with said outlet opening, a bonnet having the lower end thereof hollowed out and inserted into said casing into contact with the top of said sealing ring, means for securing said bonnet to said casing and for simultaneously forcing the same into compression relation to said sealing ring, said bonnet having a plurality of ports opening into said channel, said bonnet having a metallic ring removably secured in the lower end thereof against longitudinal movement relative to said bonnet, and a valve stem passing through said bonnet and having a plunger on one end thereof, said plunger being movable into sealing relation with the inner wall of said sealing ring, and having a tapered annular surface for sealing contact with said metallic ring.

WILLIAM C. JAEGLE.